(12) United States Patent
Yamaga et al.

(10) Patent No.: US 6,702,484 B2
(45) Date of Patent: Mar. 9, 2004

(54) SHUTTER FOR CAMERA

(75) Inventors: Munetaka Yamaga, Narashino (JP); Hiroyuki Mizukami, Narashino (JP); Seiichi Oishi, Narashino (JP)

(73) Assignee: Seiko Precision Inc., Chiba-ken (JP)

( * ) Notice: Subject to any disclaimer, the term of this patent is extended or adjusted under 35 U.S.C. 154(b) by 0 days.

(21) Appl. No.: 10/187,581

(22) Filed: Jul. 2, 2002

(65) Prior Publication Data

US 2003/0021604 A1 Jan. 30, 2003

(30) Foreign Application Priority Data

Jul. 4, 2001 (JP) .................................. 2001-203670
May 30, 2002 (JP) .................................. 2002-157205

(51) Int. Cl.$^7$ ................................................ G03B 9/08
(52) U.S. Cl. ........................................ 396/463; 396/497
(58) Field of Search ................................. 396/497, 463

(56) References Cited

U.S. PATENT DOCUMENTS 5,432,576 A * 7/1995 SanGregory et al. ....... 396/449
6,123,468 A * 9/2000 Furlani et al. .............. 396/463
2002/0094204 A1 * 7/2002 Mizukami et al. .......... 396/449
2003/0021604 A1 * 1/2003 Yamaga et al. ............. 396/453

* cited by examiner

Primary Examiner—David M. Gray
(74) Attorney, Agent, or Firm—Adams & Wilks

(57) ABSTRACT

A camera shutter has a base plate provided with a shutter opening. Sectors are mounted on the base plate to undergo movement to open and close the shutter opening. A driving lever has a driving pin that extends through through-holes in the sectors for operating the sectors. One of the through-holes is configured so that a gap is formed between an edge of the through-hole and the driving pin in the direction of movement of the driving pin. As the driving pin moves to drive the sectors to close the shutter opening, the movement of the driving pin is abruptly stopped when the sectors fully close the shutter opening thereby causing the driving pin to rebound. The rebounding motion is not transmitted to the sector in which the gap is formed, and inertia permits further movement of the sector in the closing direction over a distance equal to the gap. This maintains the sectors in overlapping relation and prevents reexposure when the shutter is in a fully closed state.

8 Claims, 6 Drawing Sheets

SHUTTER FOR CAMERA

BACKGROUND OF THE INVENTION

1. Field of the Invention

The present invention relates generally to a shutter for use in a camera, and more particularly to a shutter that prevents reexposure due to rebounding of the sectors when the shutter is in the fully closed state.

2. Description of the Related Art

One camera shutter of the related art is shown in FIGS. 4–6, where a driving lever 26 is rotated by a rotor shaft of an actuator M. A driving pin 27 is mounted on the driving lever 26. A base plate 21 is provided with an elongate hole portion 21b. The driving pin 27 extends through the hole portion 21b and through through-holes 24b and 25b formed in sectors 24 and 25, respectively. The sectors 24 and 25 are mounted to pivot or swing about shafts 22 and 23, respectively. The driving pin 27 is so constructed that it makes sliding contact with the through-holes 24b and 25b.

In the related art structure described above, when the shutter is fully opened as shown in FIG. 4, the driving pin 27 is in contact with one end portion of the hole portion 21b and the shaft 23 is at rest in contact with a recessed portion of the sector 24. As shown in FIG. 5, when the driving lever 26 is rotated by the rotor shaft of the actuator M, the driving pin 27 begins to move. The driving pin 27 moves away from the end portion of the hole portion 21b, and the motion of the driving pin 27 is transmitted to the sectors 24 and 25. When the shutter is fully closed, the driving pin 27 is in contact with the other end portion of the hole portion 21b as shown in FIG. 6, and the shutter opening 21a is closed by the sectors 24 and 25. When the driving pin 27 drives the sectors 24 and 25 to the fully closed state, the driving pin 27 collides against the other end portion of the hole portion 21b and bounces or rebounds off the end portion. Since the sectors 24 and 25 are interlocked with the driving pin 27, the rebounding of the driving pin 27 causes the sectors 24 and 25 to swing back and forth in the opening and closing directions.

Therefore, if the amount of overlap between the sectors 24 and 25 is small, the problem arises that the shutter opening 21a is repeatedly opened and closed a slight amount when in the fully closed state. As a consequence, there is the danger that light leaks through the shutter opening 21a and makes a reexposure. Accordingly, to prevent reexposure, the amount of overlap between the sectors 24 and 25 must be set to a large value. However, if the amount of overlap is made larger, this prevents reducing the size of the shutter. Furthermore, this makes it difficult to improve the shutter speed, because the shutter blades are made larger and are therefore heavier.

SUMMARY OF THE INVENTION

Accordingly, it is an object of the present invention to provide a camera shutter which prevents reexposure when the shutter is in a fully closed state and permits miniaturization of the shutter and improvement in shutter speed.

A shutter for use in a camera in accordance with the present invention has a shutter opening formed in a base plate, plural sectors capable of opening and closing the shutter opening, and an operating member driven by an actuator for operating the sectors. The operating member extends through through-holes formed in the sectors. The through-hole in at least one of the sectors is so configured that a gap is formed in the direction of movement of the operating member.

By such a structure, when the shutter speed is sufficiently accelerated and the shutter opening is closed, if the operating member bounces or rebounds, the gap formed in the sector through-hole prevents the sector from directly interlocking with bounce or rebound of the operating member. Instead, this sector can still move in the direction of closing the shutter opening owing to inertia. Accordingly, when the other sector or sectors interlock with the bounce or rebound of the operating member and move in the direction to open the shutter opening, the former sector keeps moving in the direction of closing the shutter. Therefore, even if the amount of overlap between the sectors at full closure is reduced to a minimum, no reexposure occurs. Consequently, the shutter blades and hence the whole shutter can be miniaturized. Furthermore, by reducing the size and hence the weight of the shutter blades, the shutter speed is improved.

DETAILED DESCRIPTION OF THE PREFERRED EMBODIMENTS

One embodiment of the present invention will be described with reference to the drawings.

Figure 1:
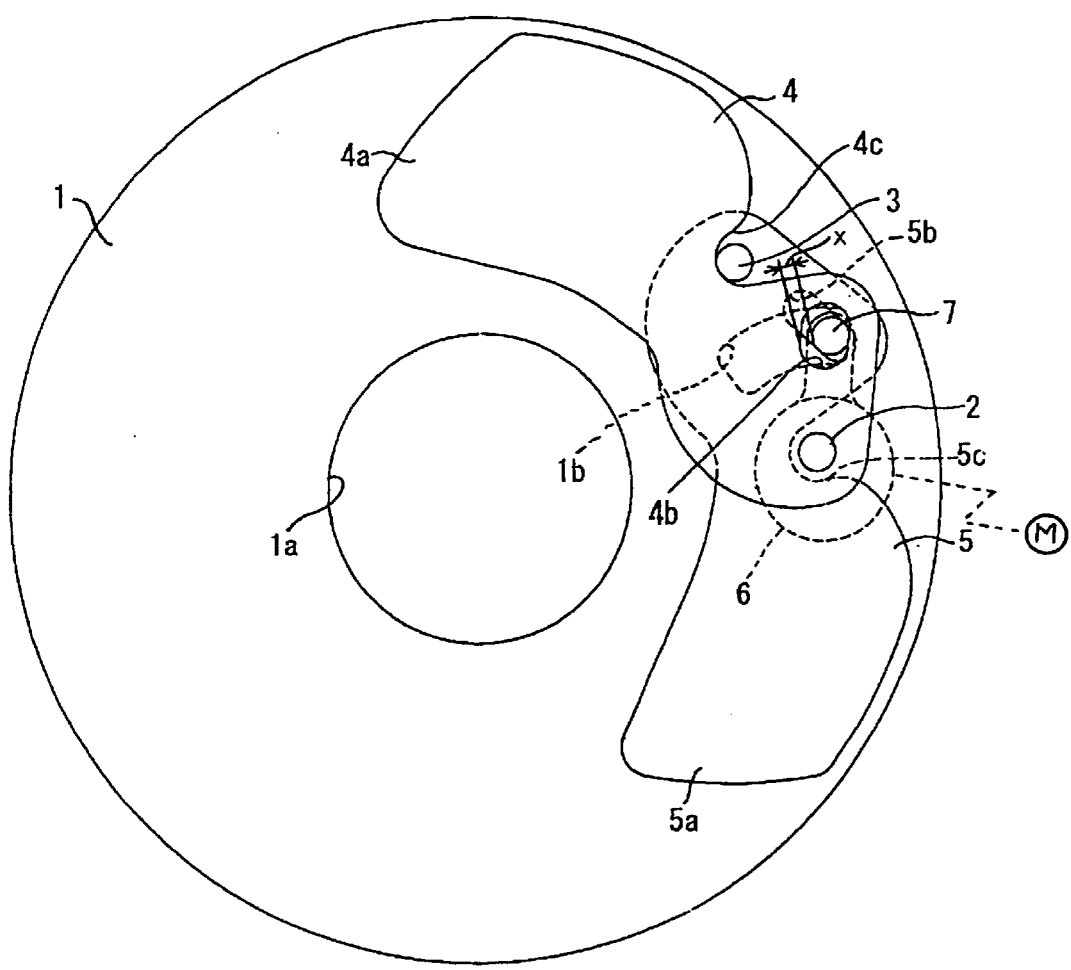
FIG. 1 is a front elevation of one embodiment of a shutter for a camera according to the present invention, showing the state in which the shutter opening is opened.
Figure 2:
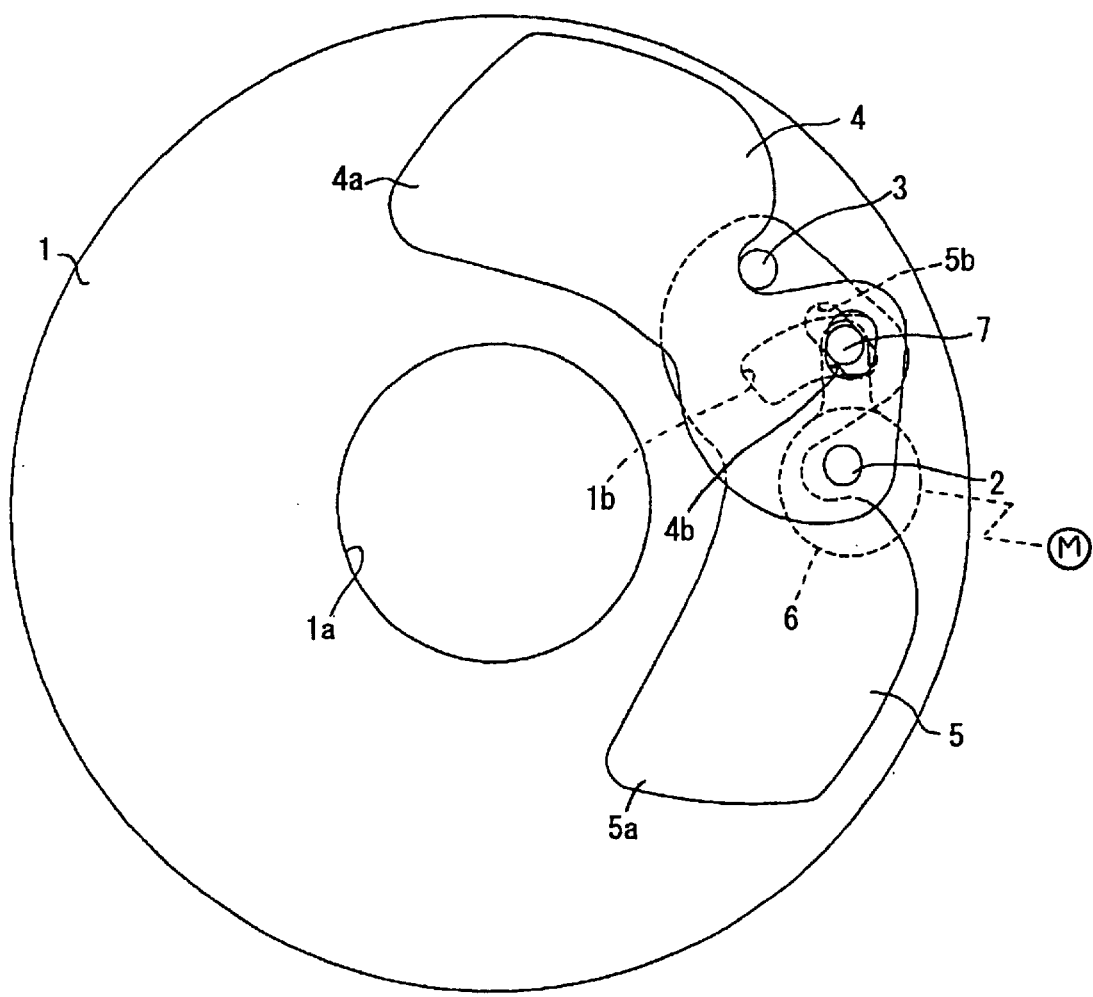
FIG. 2 is a front elevation similar to FIG. 1, but showing the initial state of an operation for closing the shutter opening.
Figure 3:
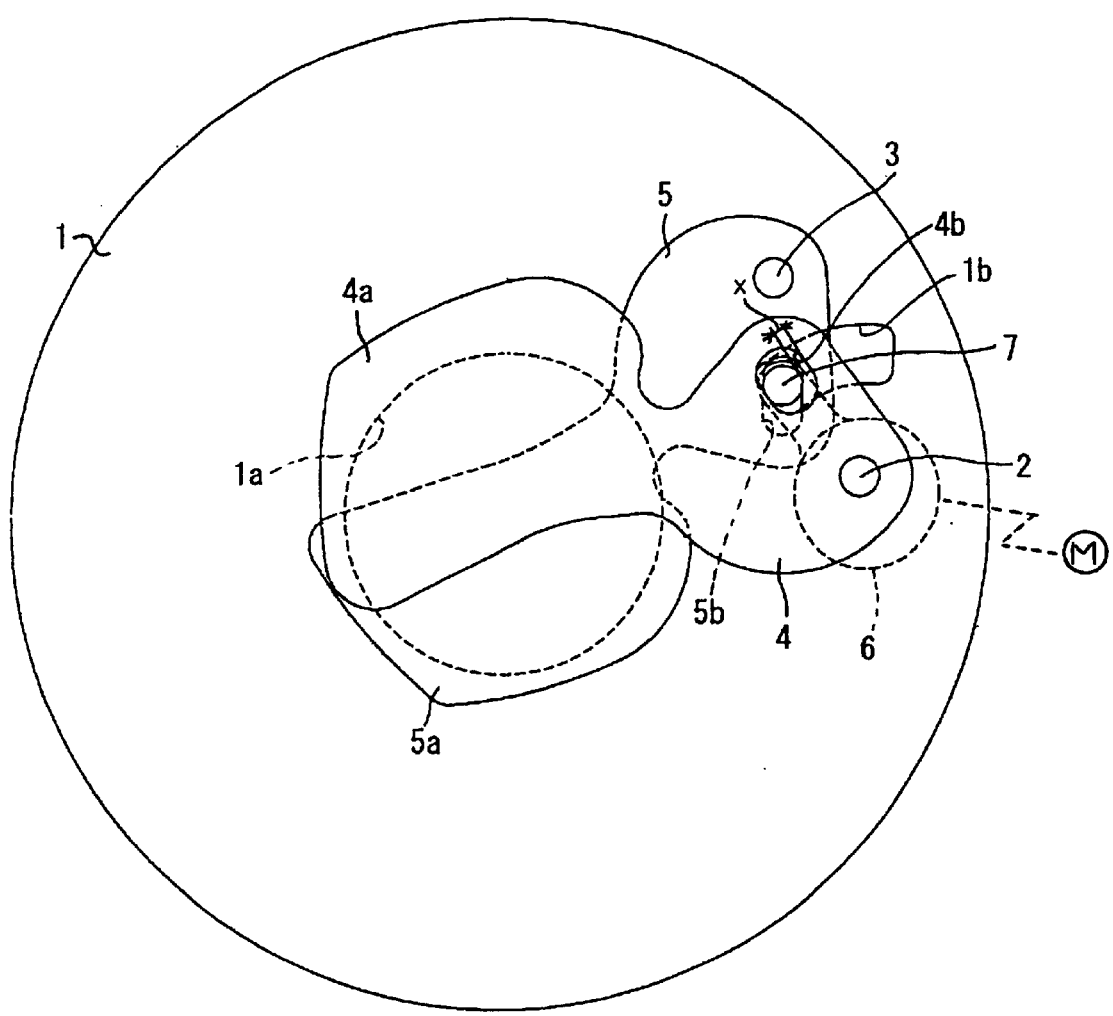
FIG. 3 is a front elevation similar to FIG. 1, but showing the state in which the shutter opening has been closed.

As shown in FIGS. 1–3, a shutter base plate 1 is provided with a shutter opening 1a. Two sectors 4 and 5 for opening and closing the shutter opening 1a are mounted on the front side of the shutter base plate 1. An operating member such as a driving lever 6 for driving both sectors and a protrusion such as a driving pin 7 are mounted on the rear side of the shutter base plate 1.

The sectors 4 and 5 have front-end portions 4a and 5a, respectively, which are so shaped that they can cooperate to close the shutter opening 1a. The sectors 4 and 5 are pivotally mounted at their respective base portions to pivot or swing about shafts 2 and 3, respectively, mounted on the shutter base plate 1. The shutter base plate 1 has an elongate hole portion 1b for limiting the swing angle of the driving lever 6. The protrusion or driving pin 7 is fixedly mounted with a press fit to the front-end portion of the driving lever 6 and extends through the hole portion 1b from the rear side and protrudes out on the front side.

Mounted on the rear side of the shutter base plate 1 are the driving lever 6 (operating member) and an actuator M for driving the driving pin 7. The actuator M comprises, in this embodiment, a U-shaped core, a coil wound around one arm of the U-shaped core, and a rotor capable of being magnetically coupled to the magnetic pole portion of the core. The rotor shaft of the rotor fits in a center hole within the driving lever 6 and pivotably or swingably drives the driving lever 6 in response to rotation of the rotor.

Through-holes 4b and 5b through which the driving pin 7 extends are formed close to the base portions of the sectors 4 and 5. The through-hole 5b is so configured that when the driving pin 7 extends therethrough, the driving pin 7 makes sliding contact at all times in the direction of movement of the driving pin 7, i.e., along the hole portion 1b. Also, the through-hole 4b is so configured that when the driving pin 7 extends therethrough, a gap x is present in the direction of movement of the driving pin 7, i.e., along the hole portion 1b. When the shutter opening 1a is fully opened as shown in FIG. 1, the driving pin 7 abuts against the right end (outer side of the shutter base plate 1) of the hole portion 1b. The gap x in the through-hole 4b is located between an edge of the through-hole 4b and the driving pin 7 and is located on the left side of the driving pin 7. The shaft 3 abuts against a recessed portion 4c of the sector 4, whereby the sector 4 is placed in position to begin its closing movement. The shaft 2 is opposite to a recessed portion 5c of the sector 5 with a slight gap therebetween.

Figure 4:
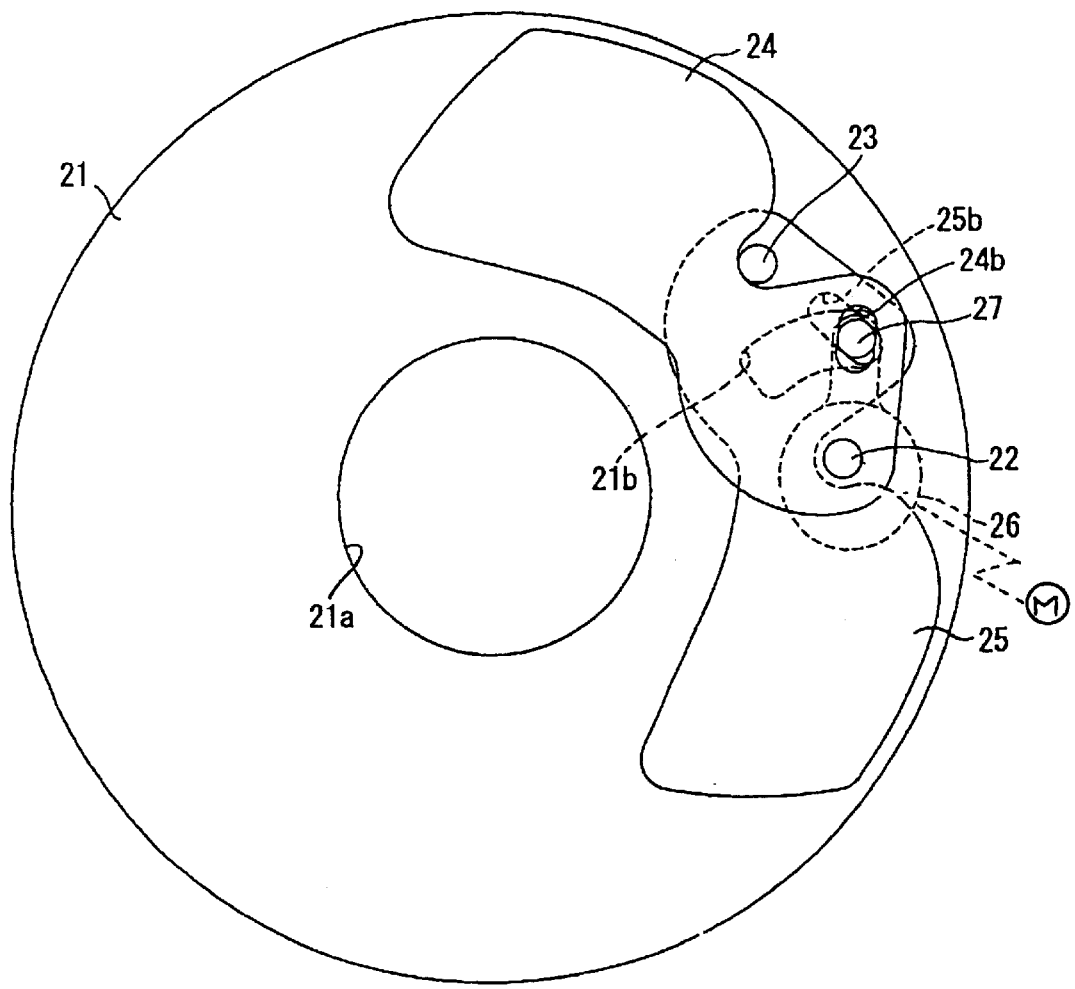
FIG. 4 is a front elevation of a camera shutter according to the related art, showing the state in which the shutter opening is opened.
Figure 5:
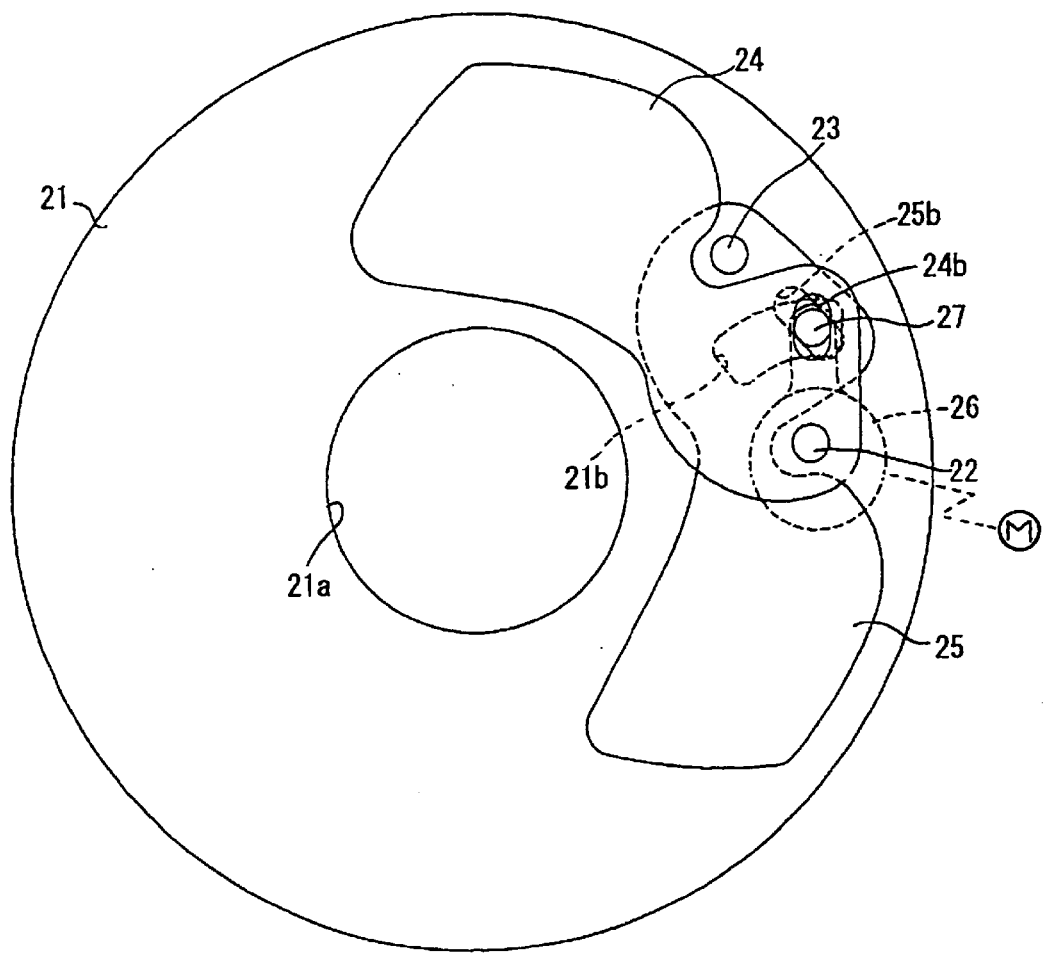
FIG. 5 is a front elevation similar to FIG. 4, but showing the initial state of an operation for closing the shutter opening.
Figure 6:
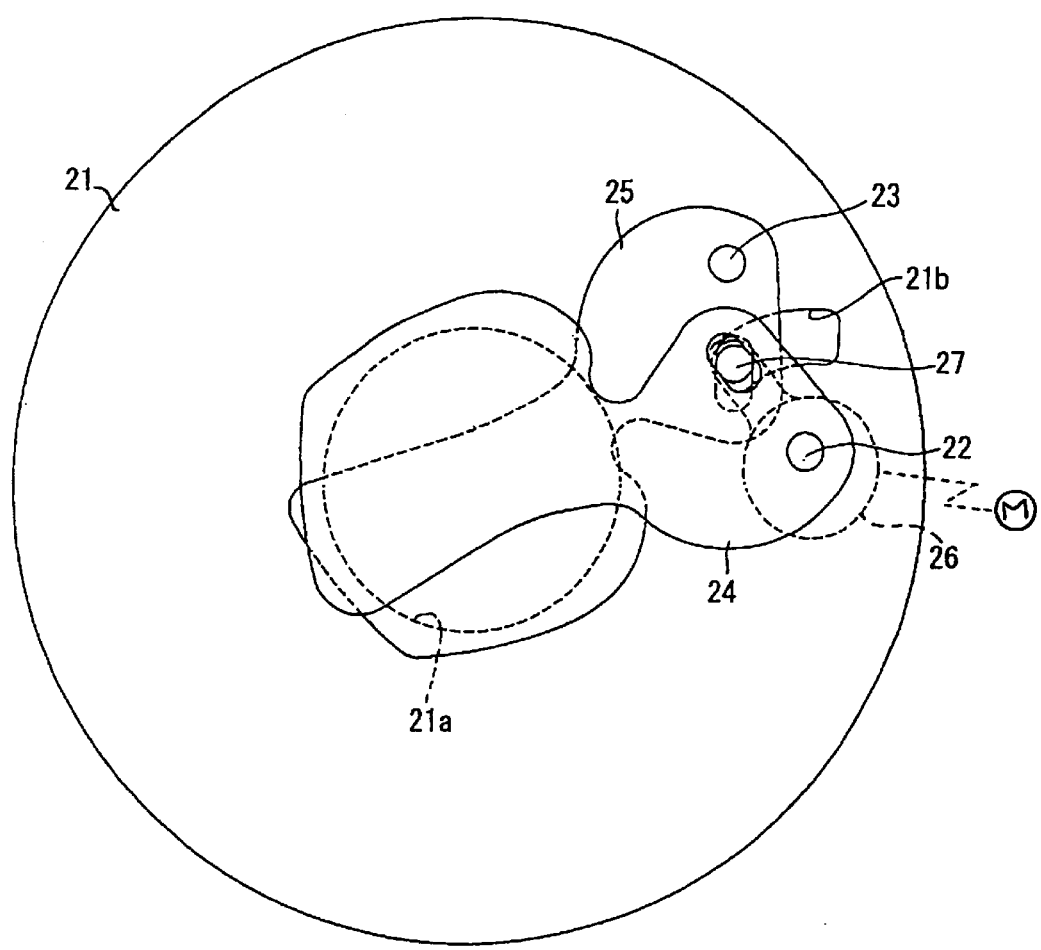
FIG. 6 is a front elevation similar to FIG. 4, but in which the shutter opening has been closed.

Heretofore, in the related art structures the sizes of the through-holes 4b and 5b (24b and 25b in FIGS. 4–6) have been so set that when the driving pin 7 extends therethrough, a slight gap is present in the direction of movement of the driving pin 7. However, this gap is created solely due to fit tolerance and assumes a quite small value of approximately 0.02 to 0.03 mm. In the present embodiment, the gap x under the condition where the driving pin 7 extends through the through-hole 4b is intentionally enlarged. By way of example, in the present embodiment the gap x is set to 0.18 mm. The magnitude of the gap x is determined taking into account the size of the shutter (inertia), the characteristics of the motor, and so on. Preferably, the gap x is set within the range of about 0.1 to 0.3 mm.

FIG. 3 shows the state wherein the shutter opening 1a has been fully closed by swinging the driving lever 6 from the state of FIG. 1 in a counterclockwise direction by rotation of the rotor of the actuator M. Under this condition, the front-end portions 4a and 5a of the sectors 4 and 5 close the shutter opening 1a. When the shutter opening 1a is fully closed in this way, the driving pin 7 abuts against the left end (center side of the shutter base plate 1) of the hole portion 1b, and the gap x in the through-hole 4b is on the right side of the driving pin 7.

The operations for moving the sectors 4 and 5 from the fully opened state of the shutter opening 1a shown in FIG. 1 to the fully closed state of FIG. 3 to close the shutter opening 1a are described below.

To operate the sectors 4 and 5, the coil on the actuator M is electrically energized with a driving pulse signal of one polarity to cause the rotor to rotate in a counterclockwise direction, thereby pivoting or swinging the driving lever 6 in a counterclockwise direction via the rotor shaft. Then, the sector 5 is first swung via the sliding connection between the driving pin 7 and the through-hole 5b. The driving pin 7 moves away from the right end of the hole portion 1b and arrives at the position of FIG. 2 where the driving pin 7 abuts against the through-hole 4b. After the driving pin 7 comes into contact with the through-hole 4b, movement of the driving pin 7 swingably drives the sectors 4 and 5. During this swinging motion, the rotational speed of the rotor has been sufficiently accelerated and therefore the moving speed of the sectors 4 and 5 is large. As shown in FIG. 3, the driving pin 7 collides against the left end of the hole portion 1b, thus preventing further closing movement of the driving pin 7 and placing the shutter opening 1a in a closed state.

When the driving pin 7 collides against the left end of the hole portion 1b at a large speed, the driving pin 7 bounces or rebounds off the hole portion 1b. The bouncing or rebounding of the driving pin 7 is transmitted to the sector 5 via the through-hole 5b, causing the sector 5 to move in the direction of opening the shutter opening 1a. However, since the gap x is formed between the driving pin 7 and the through-hole 4b, the bounce or rebound of the driving pin 7 is not transmitted to the sector 4. Thus the sector 4 continues to further move a distance equal to the gap x in the direction of closing the shutter opening 1a due to its inertia. Therefore, the sector 4 moves in the closing direction although the sector 5 moves in the opening direction, and the desired overlap between the sectors 4 and 5 is maintained over the shutter opening 1a. When the driving pin 7 abuts against the left end of the hole portion 1b and the shutter opening 1a is fully closed, the region between the sectors 4 and 5 is not opened and therefore no light leaks through the shutter opening 1a. Consequently, reexposure will not occur.

According to the present invention, the amount of the overlap of the sectors 4 and 5 is only the amount required to prevent exposure when the sectors are at rest in the fully closed state. The closed state can be sufficiently maintained with a smaller amount of overlap than in the related art case where both sectors move in opposite directions (i.e., in the opening and closing directions) while interlocked with the bounce or rebound of the driving pin 7 under the fully closed state. As a consequence, the sectors can be miniaturized. Because of miniaturization of the sectors, the shutter base plate 1 can be reduced in size, resulting in the miniaturization of the whole shutter and sectors. This contributes to reducing the weight of the sectors, so that the shutter speed is also improved.

Under the condition of FIG. 3, if a driving pulse signal of the opposite polarity is supplied to the coil, the rotor is rotated in a clockwise direction, and the driving lever 6 is swung in a clockwise direction via the rotor shaft, whereby the sector 5 immediately starts to swing in the opening direction. The sector 4 begins to swing in the opening direction with a slight delay corresponding to the time in which the driving pin 7 passes across the gap x. Subsequently, the sectors 4 and 5 swing together and return to the positions shown in FIG. 1. When the driving pin 7 abuts against the right end of the hole portion 1b, the sector 5 comes to a stop. The sector 4, however continues to further swing in the direction of opening the shutter opening 1a by its own inertia. When the shaft 3 abuts against the recessed portion 4c of the sector 4, the sector 4 also comes to a stop. The shutter opening 1a is thus placed in a fully opened state. Also, when the driving pin 7 abuts against the right end of the hole portion 1b, the driving pin 7 rebounds. When the driving pin 7 rebounds, however, the rebound is not transmitted to the sector 4, because the gap x is present in the through-hole 4b of the sector 4.

In the example above, only the through-hole 4b has the gap x outside of the driving pin 7. The through-hole 5b may also be so configured that a gap x is present outside of the driving pin 7. In this case, when the shutter opening 1a is fully closed, the bounce or rebound of the driving pin 7 is transmitted to neither of the sectors 4 and 5 and both sectors continue to swing in the closing direction due to inertia. Therefore, the amount of overlap between the sectors can be reduced further. In this case, when the shutter opening 1a is fully opened, the recessed portion 5c of the sector 5 abuts against the shaft 2 and is placed in position.

In addition, the structure for controlling the swing angle of the sectors 4 and 5 during opening and closing of the shutter opening 1a is not limited to the above-described structure in which the driving pin 7 collides against both ends of the hole portion 1b. For example, the structure may be so designed that a positioning pin stands upright from the shutter base plate 1 and the sectors are collide against the positioning pin.

As described thus far, a camera shutter according to the present invention has plural sectors provided with through-holes. The through-hole in at least one of the sectors is so configured that a gap is formed in the direction of movement of an operating member extending through the through-hole. When the shutter opening is closed, if the movement of the operating member is suddenly hindered and a rebound occurs, the sector will not be directly interlocked with the rebound. Rather, the sector can continue to move in the direction of closing the shutter due to its inertia. Therefore, if the amount of overlap between the sectors in the fully closed condition is reduced to a minimum, reexposure will not take place. Consequently, miniaturization can be accomplished, and the shutter speed can also be enhanced.

What is claimed is:

1. A shutter for use in a camera, comprising:

a base plate having a shutter opening and a hole portion;

plural sectors capable of opening and closing the shutter opening, each of the sectors being provided with a through-hole; and an operating member driven in the hole portion by an actuator for operating the sectors, the operating member extending through the through-holes in the sectors; wherein the through-hole in at least one of the sectors is so configured that a gap is formed in the direction of movement of the operating member.

2. A shutter for a camera comprising: a base plate having a shutter opening and a hole portion; plural sectors mounted to undergo movement in a closing direction to a closed position wherein the sectors overlap one another and fully cover the shutter opening and to undergo movement in an opening direction to an open position wherein the sectors do not cover the shutter opening, each sector having a through-hole extending therethrough; and an operating member having a protrusion that extends through the hole portion and extends through and is slidably engageable with the sector through-holes and being driven in a closing direction during use of the shutter to drive the protrusion in the hole portion to thereby drive the sectors from the open position to the closed position; wherein at least one of the sector through-holes is configured to provide a gap between the protrusion and an edge of the through-hole when the sectors are in the open position, the gap being sufficiently large to permit each sector having the gap to continue movement in the closing direction due to its inertia after the sectors are driven to the closed position to thereby maintain the sectors in overlapping relation.

3. A shutter for a camera according to claim 2; wherein the gap is in the range of about 0.1 to 0.3 mm.

4. A shutter for a camera according to claim 2; wherein the hole portion in the base plate is configured to limit the extent of movement of the sectors in the closing direction and cause the sectors to rebound after reaching the closed position, the gap being sufficiently large to permit each sector having the gap to continue movement in the closing direction at a time when each sector not having the gap is rebounding in the opening direction.

5. A shutter for a camera according to claim 4; wherein the plural sectors comprise two sectors, one sector having the gap and one sector not having the gap.

6. A shutter for a camera according to claim 4; wherein the hole portion comprises an elongate hole portion through which extends the protrusion of the operating member, the protrusion abutting an end of the elongate hole portion to limit the extent of movement of the sectors in the closing direction.

7. A shutter for a camera according to claim 6; wherein the gap is in the range of about 0.1 to 0.3 mm.

8. A shutter for a camera according to claim 4; wherein the gap is in the range of about 0.1 to 0.3 mm.

* * * * *